(12) United States Patent
Yamatani et al.

(10) Patent No.: US 6,295,103 B1
(45) Date of Patent: Sep. 25, 2001

(54) ELECTRONIC PART PROTECTING STRUCTURE HAVING DEFORMABLE PINS

(75) Inventors: Takuji Yamatani, Nara; Youko Sumida, Kashiba; Takumi Matsumoto, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/126,811

(22) Filed: Jul. 31, 1998

(30) Foreign Application Priority Data

Aug. 29, 1997 (JP) ..................... 9-234856
Mar. 23, 1998 (JP) ................... 10-074640

(51) Int. Cl.[7] ............. G02F 1/1333; H01J 5/00; H05K 7/14
(52) U.S. Cl. ............... 349/58; 174/50; 361/801
(58) Field of Search ................... 174/50; 349/58; 361/801

(56) References Cited

U.S. PATENT DOCUMENTS

| | | | |
|---|---|---|---|
| 5,119,204 | * 6/1992 | Hashimoto et al. | 349/58 |
| 5,272,278 | * 12/1993 | Wuertz | 174/67 |
| 5,669,124 | * 9/1997 | Kusmiss | 29/20 |

FOREIGN PATENT DOCUMENTS

| | | |
|---|---|---|
| 4-72054 | 6/1992 | (JP) . |
| 3020870 | 11/1995 | (JP) . |
| 9-239124 | 9/1997 | (JP) . |

* cited by examiner

Primary Examiner—Walter J. Malinowski
(74) Attorney, Agent, or Firm—Nixon & Vanderhye PC

(57) ABSTRACT

A small-sized, simple and inexpensive electronic part protecting structure and process enabled to prevent the reconstruction of electronic parts by preventing a case from being opened. Into a plurality of through holes formed in the surface of one case, there are loosely fitted projecting pieces which are provided on the surface of the other case. The projecting pieces are provided at their leading ends with deformed portions which are made so larger than the through holes that they can not be restored. By these deformed portions, the cases cannot be easily opened to prevent the electronic parts protected between the cases from being easily extracted while preventing the reconstruction. The case having the projecting pieces is made of a metal or resin. The through holes are formed in recesses of the case surface. The cut-off the deformed portions is detected and reported. Into the through holes formed in the surface and back protecting cases, on the other hand, there is inserted a protecting pin member. This protecting pin member has a flat portion at its one end, and a deformed portion is formed at the other end after the protecting pin member was inserted. The flat portion and the deformed portion are made so larger than the through holes that they can not be restored. As a result, the cases cannot be easily opened to prevent the easy extraction of the electronic parts protected therebetween and to prevent the reconstruction.

5 Claims, 13 Drawing Sheets

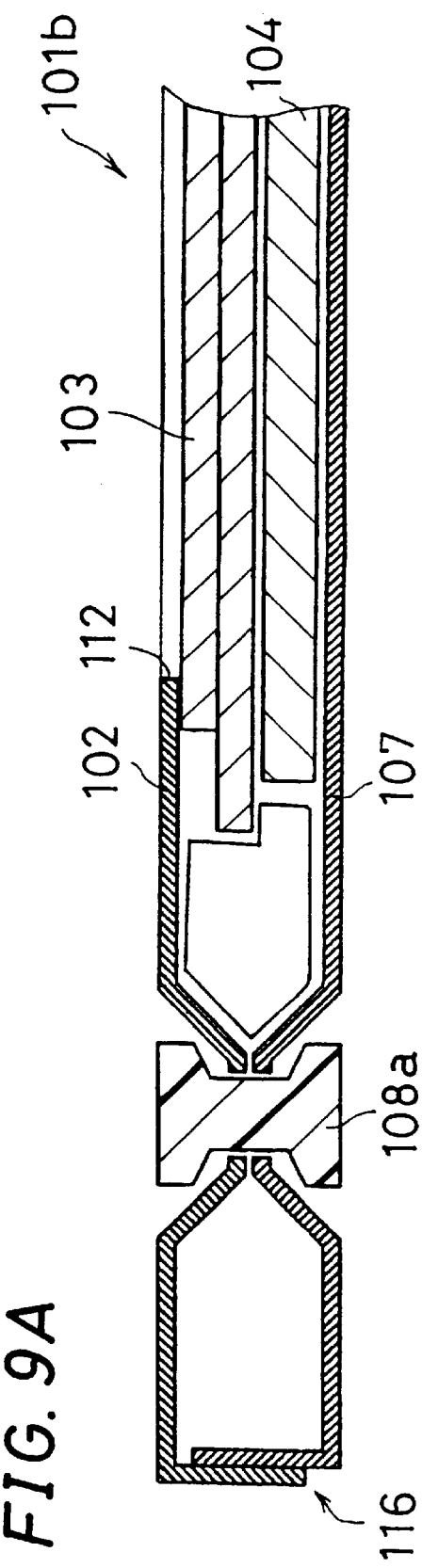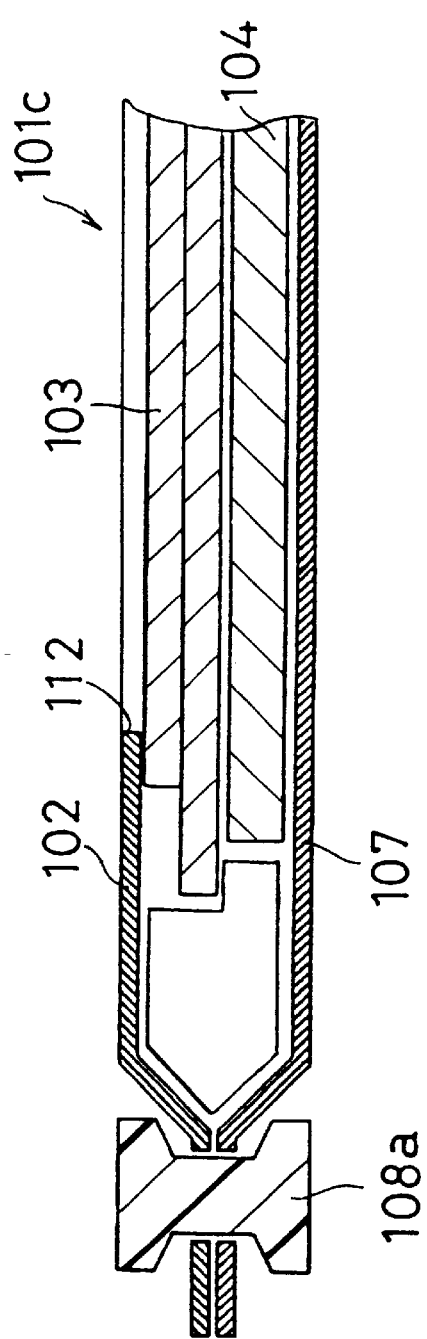
FIG. 9A
FIG. 9B

ELECTRONIC PART PROTECTING STRUCTURE HAVING DEFORMABLE PINS

BACKGROUND OF THE INVENTION

1. Field of the Invention

The present invention relates to an electronic part protecting structure and process for protecting electronic parts such as a liquid crystal display element, a substrate of a drive circuit for driving the liquid crystal display element and a light source of the liquid crystal display element by a pair of cases.

2. Description of the Related Art

A liquid crystal display device includes electronic parts such as a liquid crystal display element, a substrate of a drive circuit for driving the liquid crystal display element and a light source of the liquid crystal display element. The liquid crystal display element, drive circuit substrate and light source are arranged between and protected by a pair of cases when they are used. Thus, the electronic parts are protected from the surrounding circumstance by the cases.

FIG. 13A is an exploded perspective view showing a structure of the liquid crystal display device of a first prior art, and FIG. 13B is a section of the same. One 11 of a pair of cases 11 and 12 for arranging the electronic parts therebetween is made larger than the other 12. In a side face 11a of the case 11, there is formed an opening 13. In a side face 12a of the case 12, there is formed a pawl 14 which is directed outward of the case 12 and given substantially the same height as the depth of the opening 13. The electronic parts, as arranged between the cases 11 and 12, are assembled by covering the case 12 with the case 11 to fit the opening 13 and the pawl 14 to each other.

FIG. 14 is a section showing a structure of the liquid crystal display device of a second prior art. A pair of cases 15 and 16 are fastened and assembled together with electronic parts 18 by tapping screws 17.

In a first structure, the cases 11 and 12 can be opened to extract the electronic parts by forming a gap between the side faces 11a and 12a and can be assembled again to restore with no trace of disassembly. In a second structure, the cases 15 and 16 can also be opened to extract the electronic parts by loosening the tapping screws 17 and can be assembled again to restore with no trace of disassembly. From the liquid crystal display device to be applied to a play machine such as an electronic control type pinball machine and used publicly, therefore, the electronic parts can be extracted and reconstructed so that the liquid crystal display device can be restored without leaving no trace and can be illegally used.

As a countermeasure for preventing the reconstruction of the electronic parts, there is disclosed a device for detecting the opening of cases in Japanese Utility Model Registration No. 3020870. In the technique disclosed, the opening of the cases is electrically detected by a sealing apparatus 1, as shown in FIG. 15. Specifically, this sealing apparatus 1 includes a memory circuit 2, an oscillator 3, a frequency divider 4, a display/output circuit 5 and an erase circuit 6. When the case opening is detected in the memory circuit 2 by a sensor SE, its detection signal is stored in a flip-flop FF. These sensor SE and flip-flop FF are supplied at all times with the supply voltage from an internal power supply C1. As a result, the storing action is continued even if the external power voltage is interrupted. The external power voltage is supplied to activate the oscillator 3, the frequency divider 4 and the display/output circuit 5 thereby to divide a signal SO from the oscillator 3 by the frequency divider 4, to generate a display signal by using frequency dividing signals S1 and S2 and to flash a light emitting diode LED1. The flashing pattern of the light emitting diode LED1 is switched according to the output of the flip-flop FF so that the opening of the cases is quickly reported in terms of the flashing state of the light emitting diode LED1.

In Japanese Unexamined Utility Model Publication JP-U 4-72054(1992), on the other hand, there is disclosed a protective cover mounting structure for protecting a display device in a vehicle. The display device is so buried in the dash board that it can be pulled out. Specifically, a slider 21, as shown in FIG. 16, is buried in the dash board, and the display device is arranged in the slider 21 and pulled out together with the slider 21. In the inner circuit of a protective cover 22 attached to the leading end of the slider 21 for protecting the display of the display device, there is formed a groove 25 which encloses the side face of the slider 21 when attached to the slider 21. A plurality of holes 23 are formed in the leading end of the slider 21. A welded portion 24 is formed by covering the leading end of the slider 21 with the protective cover 22 and by spot-welding the groove portion of the protective cover 22 enclosing the holes 23 from the inside of the slider.

When the opening of the cases is to be electrically detected by the apparatus shown in FIG. 15, the many components including the sensor SE, the flip-flop FF, the internal power supply C1 and the light emitting diode LED1 are required to enlarge and complicate the structure thereby to make it expensive. When the mounting structure shown in FIG. 16 is applied to the structure for protecting the electronic parts, one or both of the cases cannot be reused, if once opened when the electronic parts are defective, to lower the using efficiency of the parts.

SUMMARY OF THE INVENTION

An object of the invention is to provide a small-sized, simple and inexpensive electronic part protecting structure and process capable of preventing a case from being opened and blocking reconstruction of electronic parts.

The invention provides an electronic part protecting structure for protecting electronic parts, comprising a pair of cases between which the electronic parts are arranged, one of the pair of cases being provided with a through hole, the other case being provided with a projecting piece to be inserted into the through hole, wherein a deformed portion is provided at a leading end of the projecting piece which deformed portion is made larger than the through hole and deformed to be unrestorable.

According to the invention, the electronic parts are arranged between the one case having the through hole and the other case having the projecting piece. The deformed portion which is larger than the through hole and deformed to be unrestorable, is provided at the leading end of the projecting piece, which is to be inserted into the through hole. The one and other cases cannot be easily opened by that deformed portion. As a result, the electronic parts can be prevented from being extracted and reconstructed. This protecting structure can be realized at a reasonable cost with a relatively small number of components only by a mechanical working to make the structure simple and small.

In the invention, moreover, the case having the projecting piece is made of a metal or resin.

According to the invention, when the case having the projecting piece is made of a metal or resin, the projecting piece is inserted into the through hole and can be easily deformed at its leading end by heat or pressure to provide the deformed portion. When the resin has a relatively low thermal conductivity, on the other hand, it is possible to shield the heat which is transferred at the deforming time to the electronic parts to be protected. In the metal or resin case having the projecting piece, therefore, the deformed portion can be easily made by the heat or pressure. In the case made of a resin having a relatively low thermal conductivity, on the other hand, the electronic parts to be protected can be protected against the heat.

In the invention, moreover, the projecting piece is loosely fitted in the through hole.

According to the invention, the projecting piece is loosely fitted in the through hole so that the cases are not adhered to each other. When the electronic parts to be protected are defective, therefore, the deformed portion can be cut off to open the cases thereby to extract the electronic parts. At this time, the case having the through hole can be reused. When the deformed portion is cut off to open the case at the destination of shipping, on the other hand, the cut face is formed to leave the trace of disassembly. This makes it easy to discriminate that the cases have been opened, and to easily discover the unauthorized use of the reconstructed electronic parts. If the case for the projecting piece is made unavailable, moreover, it is possible to restore the electronic part protecting structure.

In the invention, moreover, the through hole and the projecting piece are provided in plurality.

According to the invention, the cases cannot be laterally turned in opposite directions to each other so that they can be prevented from being easily opened.

In the invention, moreover, the through hole is formed in a recess which is formed in a case surface.

According to the invention, the through hole is formed in the recess so that the deformed portion can be made hard to cut off after the protection thereby to prevent the easy opening of the cases. It is possible to make such a simple shape that the projecting piece is not popped up after the protection from the case surface.

In the invention, moreover, the protecting structure includes detecting means for detecting that the projecting piece is cut off.

According to the invention, since the cut-off of the projecting piece is detected, the opening of the cases can be reported according to the detection result.

In the invention, moreover, the actions of the electronic parts are controlled according to the detection result of the detecting means.

According to the invention, the actions of the electronic parts can be controlled according to the detection result of the cut-off of the projecting piece, so that the opening of the cases can be reported by displaying it in a display element belonging to the electronic parts. By making the report with the electronic parts to be protected, no light emitting element need to be separately provided to realize the reporting construction at a reasonable cost.

In the invention, moreover, the electronic parts include a liquid crystal display element and a substrate of a drive circuit for driving the liquid crystal display element, or a liquid crystal display element, a substrate of a drive circuit for driving the liquid crystal display element and a light source of the liquid crystal display element.

According to the invention, the electronic parts such as the liquid crystal display element, the substrate of the drive circuit for driving the liquid crystal display, and the light source of the liquid crystal display element can be arranged between and protected by a pair of cases. When the device having such electronic parts is publicly used as a play device, the cases can be prevented by the protecting structure from being easily opened so that the electronic parts can be prevented from being reconstructed and illegally used.

The invention provides a process for protecting electronic parts, comprising preparing a pair of cases having a through hole and a projecting piece, respectively, and the electronic parts; arranging the electronic parts between the pair of cases and inserting the projecting piece into the through hole; and deforming the leading end of the projecting piece so larger than the through hole to be unrestorable thereby to form a deformed portion.

According to the invention, a protecting structure capable of preventing each opening of the cases can be easily realized by inserting the projecting piece into the through hole and by deforming the leading end of the projecting piece to make the deformed portion.

The invention provides an electronic part protecting structure for protecting electronic parts, comprising a pair of cases between which the electronic parts are arranged, both the pair of cases being provided with through holes,
wherein pin members are inserted into the through holes, which pin members have such deformed portions at their both ends that are made larger than the through holes and deformed to be unrestorable.

According to the invention, the electronic parts are arranged between the one and other cases having the through holes. The pin members are inserted into the through holes and the deformed portions which are larger than the through holes and deformed to be unrestorable are provided at leading ends of the pin members. The one and other cases cannot be easily opened by that deformed portion. As a result, the electronic parts can be prevented from being extracted and reconstructed. This protecting structure can be realized at a reasonable cost with a relatively small number of components only by a mechanical working to make the structure simple and small.

In the invention, moreover, the through hole is formed in a recess which is formed in a case surface.

According to the invention, the through hole is formed in the recess so that the deformed portion can be made hard to cut off after the protection thereby to prevent the easy opening of the cases. It is possible to make such a simple shape that the pin is not popped up after the protection from the case surface.

In the invention, moreover, the electronic parts include a liquid crystal display element and a substrate of a drive circuit for driving the liquid crystal display element, or a liquid crystal display element, a substrate of a drive circuit for driving the liquid crystal display element and a light source of the liquid crystal display element.

According to the invention, the electronic parts such as the liquid crystal display element, the substrate of the drive circuit for driving the liquid crystal display substrate or the light source of the liquid crystal display element can be arranged between and protected by a pair of cases. When the device having such electronic parts is publicly used as a play device, the cases can be prevented by the protecting structure from being easily opened so that the electronic parts can be prevented from being reconstructed and illegally used.

The invention provides a process for protecting electronic parts comprising preparing a pair of cases each having a through hole, the electronic parts and pin members; arranging the electronic parts between the pair of cases and inserting the pin members into the through holes; and deforming leading ends of the pin members which are made so larger than the through holes to be unrestorable thereby to form deformed portions.

According to the invention, a protecting structure capable of preventing each opening of the cases can be easily realized by inserting the pin members into the through holes and by deforming the leading ends of the pin members to make the deformed portions.

In the invention, moreover, the process for protecting electronic parts comprises forming flat portions larger than the through holes on the other ends of the pin members as opposed to the one ends which are inserted into the through holes; and after inserting the one ends into the through holes, forming the deformed portions at the one ends.

According to the invention, the deformed portions may be formed only at the one ends of the pin members so that the protecting structure can be simply made to improve the workability.

In the invention, moreover, the one ends of the pin members to be inserted into the through holes are tapered, and maximum diameters of the pin members are selected to be larger than inner diameteras of the through holes and lengthes of the pin members are selected to be larger than entire lengthes of the through holes, and the process for protecting electronic parts comprises forming the deformed portions at the one ends of the pin members after inserted.

According to the invention, when the pin members are inserted from their tapered one end portions into the through holes, the pin members are given the maximum diameter larger than the internal diameter of the through holes, the pin members cannot be inserted any more at the position in which the diameter of the pin member becomes equal to the internal diameter of the through holes, so that the pin members can be temporarily fixed in that equal state. Since the pin members have a larger length than the total length of the through holes, they are protruded, in the temporary fixed state, at their one ends from the through holes so that the deformed portions are made at the protruded portions. These deformed portions can be made in the temporary fixed state to facilitate the deformation.

BRIEF DESCRIPTION OF THE DRAWINGS

Other and further objects, features, and advantages of the invention will be more explicit from the following detailed description taken with reference to the drawings wherein:

FIG. 7 is a section of the liquid crystal display device 101a;

FIGS. 8A to 8C are diagrams stepwise illustrating a protecting process applied to the liquid crystal display device 101a;

FIGS. 9A and 9B are sectional views showing other liquid crystal display devices 101b and 101c which are protected by an electronic part protecting structure according to the third embodiment;

FIGS. 12A to 12C are diagrams stepwise illustrating a protecting process using another protective pin member 108b in place of a protective pin member 108a;

DETAILED DESCRIPTION OF THE PREFERRED EMBODIMENTS

Figure 1:
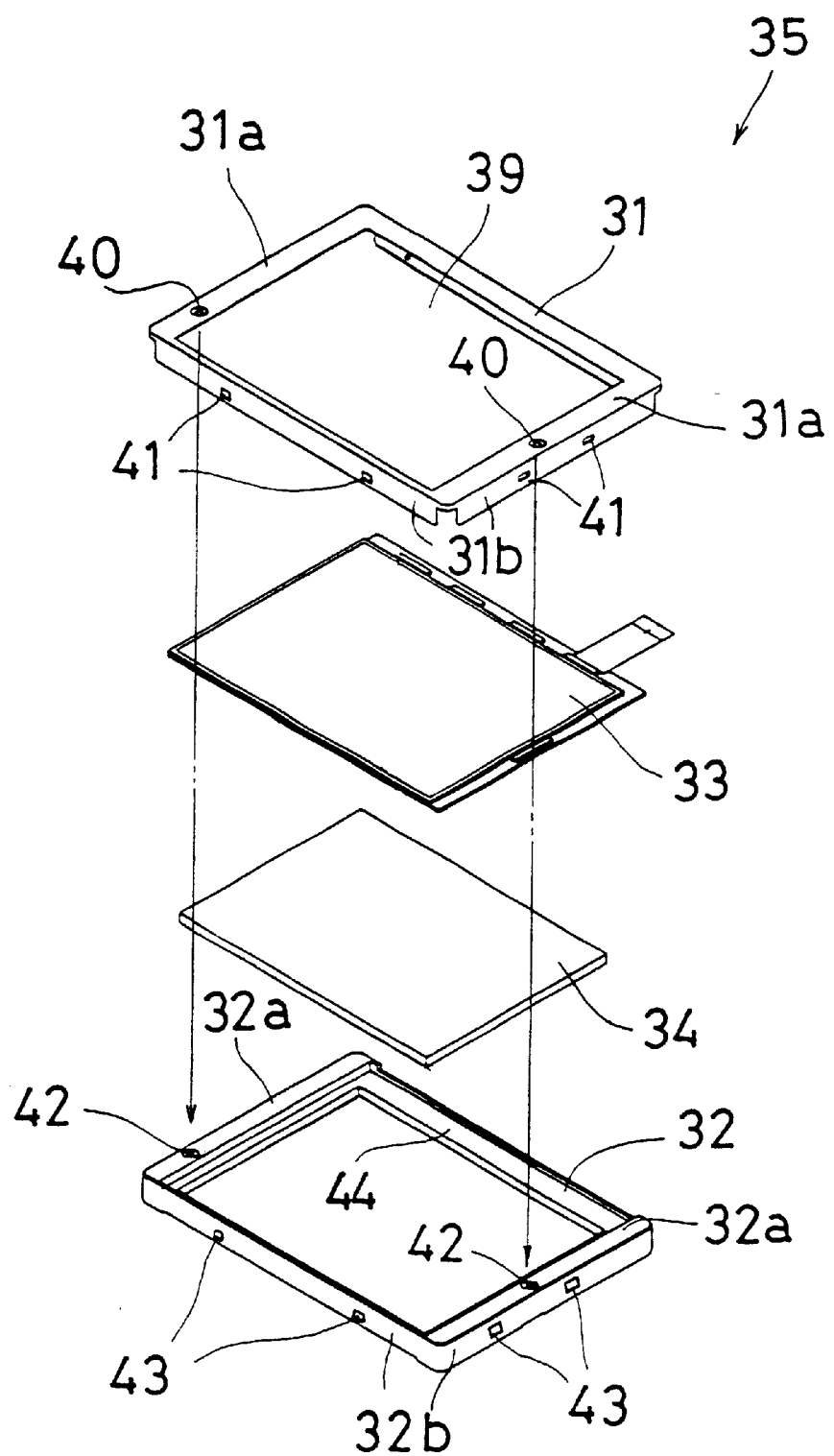
FIG. 1 is an exploded perspective view showing a liquid crystal display device 38 which is protected by an electronic part protecting structure according to a first embodiment of the invention.

Now referring to the drawings, preferred embodiments of the invention are described below.

Figure 2:
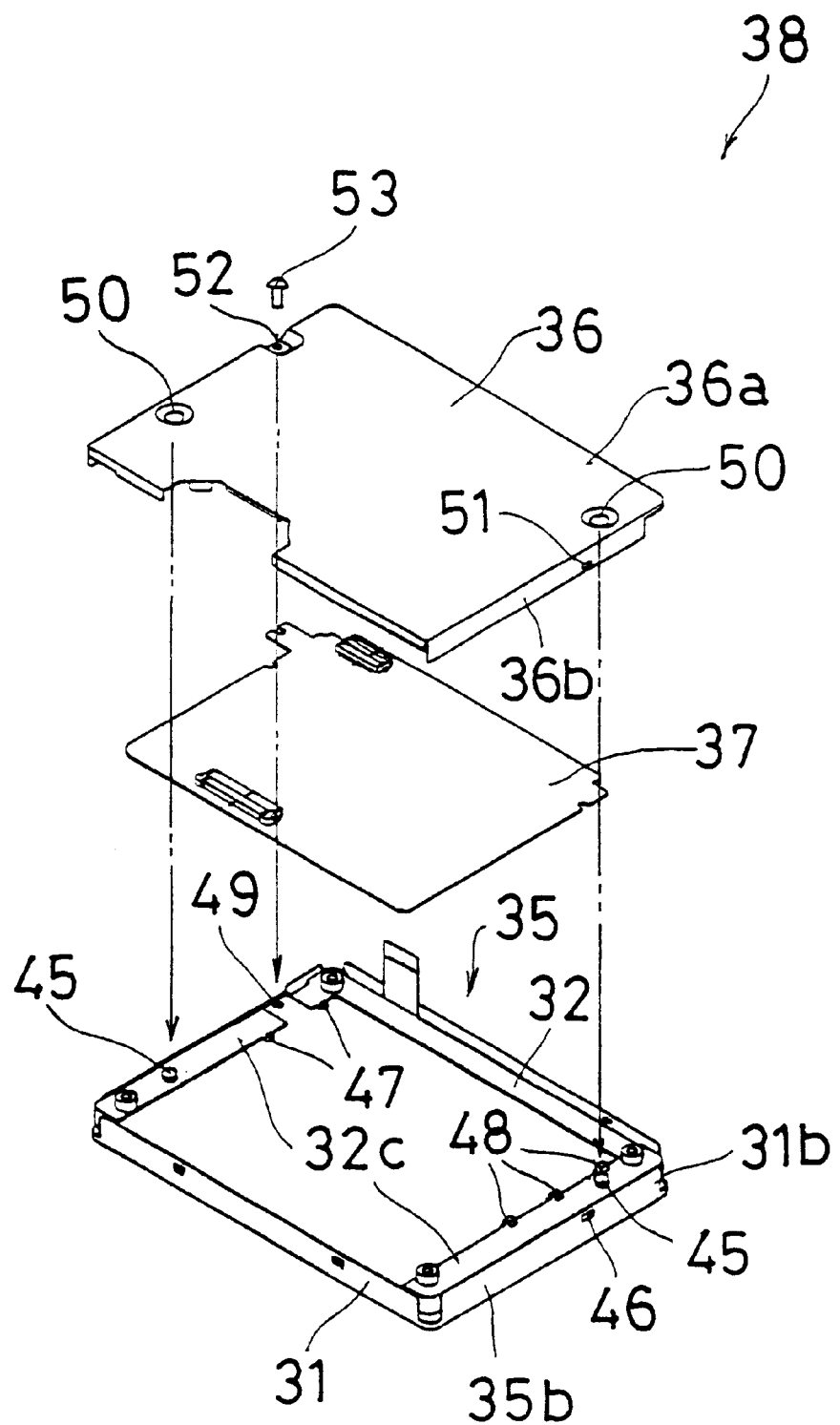
FIG. 2 is an exploded perspective view showing a portion of the liquid crystal display device 38 which is protected by an electronic part protecting structure according to the first embodiment of the invention.

FIGS. 1 and 2 are the exploded perspective views showing a liquid crystal display device 38 which is protected by an electronic part protecting structure according to a first embodiment of the invention. This liquid crystal display device 38 is constructed to include a surface protecting case 31, a frame case 32, a liquid crystal display element 33, a light source 34, a back protecting case 36 and a drive circuit substrate 37. The liquid crystal display element 33 and the light source 34 are protected between the surface protecting case 31 (or one case) and the frame case 32 (or the other case) by a protecting structure according to the invention, thus constructing liquid crystal display parts 35. The drive circuit substrate 37 is protected between the back protecting case 36 (or one case) and the frame case 32 (or the other case) by the protecting structure according to the invention, thus constructing the liquid crystal display device 38.

First of all, the surface protecting case 31 will be described with reference to FIG. 1. The surface protecting case 31 has a transparent portion 39 which is confronted by the display face of the liquid crystal display element 33 and the light irradiating face of the light source 34. In the surface 31a of the surface protecting case 31, there is formed a through hole 40. This through hole 40 may be singular or plural, but two through holes 40 are formed in this embodiment. Holes 41 are formed in the sides 31b of the surface protecting case 31. This surface protecting case 31 may be made of a metal or resin, but is made of a sheet metal in this embodiment.

The frame case 32 has an accommodation portion 44 for accommodating the liquid crystal display element 33 and the light source 34 such that the liquid crystal display element 33 is arranged at the side of the surface protecting case 31 whereas the light source 34 is arranged at the side of the frame case 32. On surfaces 32a of the frame case 32, there are formed projecting pieces 42 which protrude toward the surface protecting case 31 and correspond to the through holes 40. On sides 32b of the frame case 32, there are formed pawls 43 which correspond to the holes 41. The frame case 32 may be made of a metal or resin, but is made of a plastic resin in this embodiment.

The liquid crystal display element 33 is made by regularly arraying the minimum display units called pixels, and is provided with such a liquid crystal between two transparent substrates which are wired for applying independent drive voltages to the pixels, as acting as an optically modulating element having optical characteristics varied with the drive voltages. The light source 34 is provided for improving the visibility by optically irradiating the liquid crystal display element 33 and may be an under-type fluorescent lamp or a planar light source, but is exemplified in this embodiment by including a fluorescent lamp arranged at the inner face ends and an optical conductor for conducting the light from the lamp to the front face.

Between the surface protecting case 31 and the frame case 32, there are arranged the liquid crystal display element 33 and the light source 34 which have been confirmed to act normally. Specifically, the liquid crystal display element 33 and the light source 34 are fixed in the accommodation portion 44 of the frame case 32 by means of an adhesive double coated tape and are covered with the surface protecting case 31. The projecting pieces 42 are inserted into the through holes 40 to bring the holes 41 and the pawls 43 into engagement with each other. The leading ends of the projecting pieces 42 inserted into the through holes 40 are deformed, as will be described hereinafter. Thus, the liquid crystal display element 33 and the light source 34 are protected by the surface protecting case 31 and the frame case 32 to make the liquid crystal display parts 35.

The back protecting case 36 will be described with reference to FIG. 2. In a surface 36a of the back protecting case 36, there is formed a through hole 50. This through hole 50 may be singular or plural, but two through holes 50 are formed in this embodiment. On side face 36b of the back protecting case 36, there is formed a pawl 51. The back protecting case 36 may be made of a metal or resin but is made of a sheet metal in this embodiment as in the surface protecting case 31.

On the surface 32c of the frame case 32, as opposed to the surface 32a, there is formed a projecting piece 45 which protrudes toward the back protecting case 36 and corresponds to the through holes 50. The projecting piece 45 may be singular or plural, but two projecting pieces 45 are provided in this embodiment. In a side face 35b of the liquid crystal display parts 35, namely, in the side face 31b of the surface protecting case 31, there is formed a hole 46 which corresponds to the pawl 51.

The drive circuit substrate 37 applies the independent drive voltages to the individual pixels of the liquid crystal display element 33.

Between the frame case 32 and the back protecting case 36, there is arranged the drive circuit substrate 37. Specifically, the drive circuit substrate 37 is positioned on the frame case 32 of the turned-back liquid crystal display parts 35 by using positioning members 47 provided at the case 32 and is fixed by using holding pawls 48 provided at the case 32. The drive circuit substrate 37 is then covered with the back protecting case 36. The projecting pieces 45 are inserted into the through holes 50 to bring the hole 46 and the pawl 51 into engagement with each other, and a tapping screw 53 is fastened into a threaded hole 52 formed in the back protecting case 36 and into a threaded hole 49 formed in the frame case 32. The projecting pieces 45 inserted into the through holes 50 are deformed at their leading ends, as will be described hereinafter. Thus, the drive circuit substrate 37 is protected to construct the liquid crystal display device 38 by the frame case 32 and the back protecting case 36.

Figure 3A:
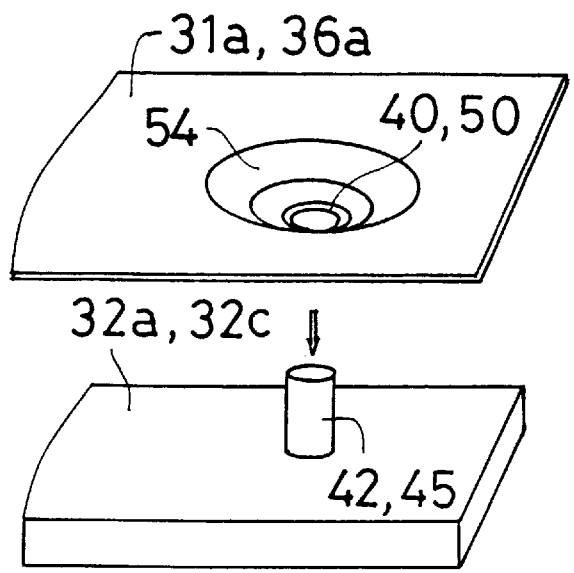
FIGS. 3A to 3D are diagrams stepwise illustrating a protecting process applied to the liquid crystal display device 38.

FIGS. 3A to 3D are diagrams stepwise illustrating a protecting process applied to the liquid crystal display device 38. Here, the protecting process deforms the leading ends of the projecting pieces 42, 45 which have been inserted into the through holes 40, 50, such that they are made so larger than the through holes 40 and 50 as to have no restoration. Here, before the protecting process, the tests are executed on the operations of the liquid crystal display device. The liquid crystal display device is disassembled and corrected, if found defective, so that only the non-defective device is protected. On the other hand, the through hole 40 or 50 is provided, as shown in FIG. 3A, in a recess 54 which is formed in the surface 31a or 36a of the case.

Figure 3B:
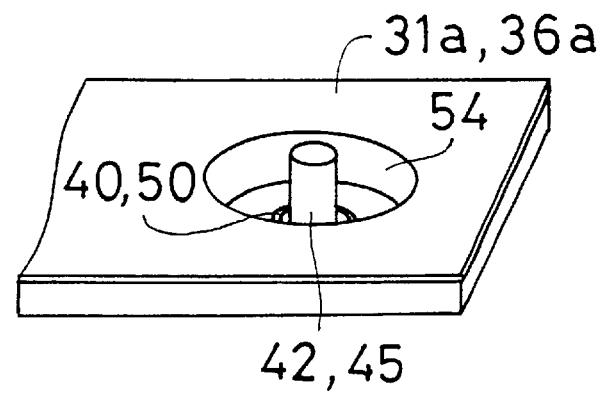
Figure 3C:
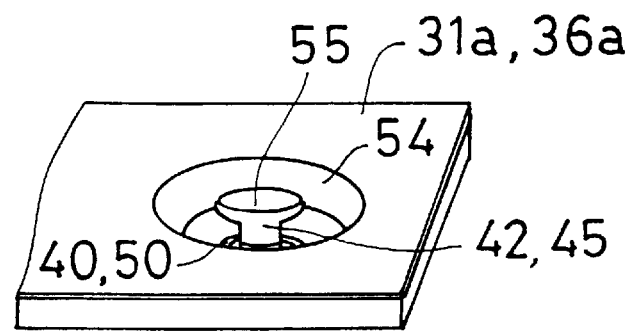
Figure 3D:
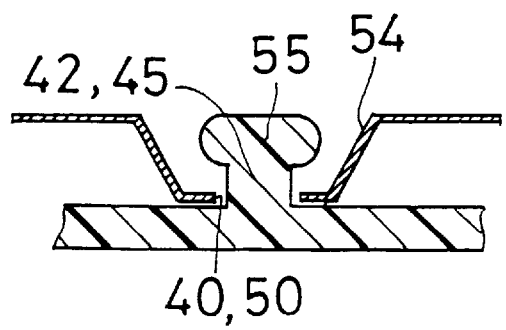

The projecting piece 42 or 45 is inserted into the through hole 40 or 50, as shown in FIG. 3B. Next, the leading end of the projecting piece 42 or 45 is deformed by applying heat and load to it to form a deformed portion 55, as shown in FIGS. 3C and 3D. This deformation need not require the application of both the heat and the load but may be effected by either of them.

The deformed portion 55 is formed to be larger than the through hole 40 or 50 and unrestorable. This makes it impossible to open the cases 31, 32; 32, 36 but possible to prevent the reconstruction of the liquid crystal display element 33, the light source 34 and the drive circuit substrate 37. This protecting structure can be realized merely by the mechanical working and with a relatively small number of components so that it is simple, small and inexpensive.

On the other hand, the frame case 32 having the projecting pieces 42 and 45 is made of a plastic resin in this embodiment. Even in the case where the frame case 32 is made of a metal, the leading end of the projecting piece 42 or 45 can be easily deformed by the heat or pressure to provide the deformed portion 55. When the frame case 32 is made of a resin having a relatively low heat conductivity, those electronic parts can be protected from the heat by shielding the heat which might otherwise be transferred to the liquid crystal display element 33, the light source 34 and the drive circuit substrate 37.

Figure 4:
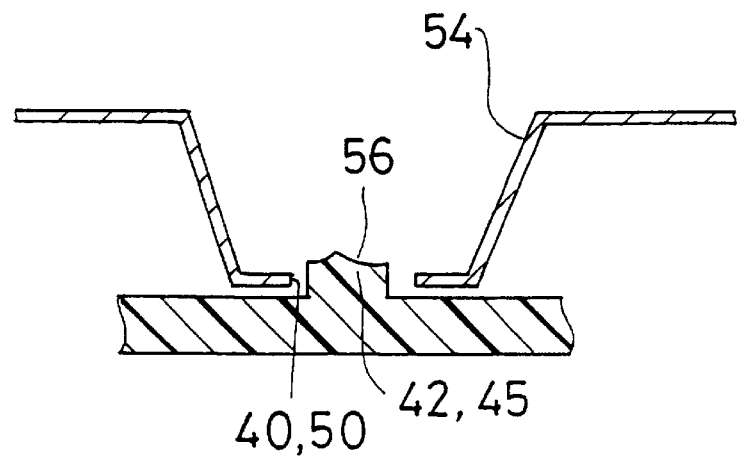
FIG. 4 is a section presenting a cut face 56 of a deformed portion 55.

The cases 31, 32; 32, 36 are not adhered by fitting the projecting pieces 42 and 45 loosely in the through holes 40, 50. If the protected electronic parts are defective, therefore, the deformed portions 55 can be cut off to open the cases 31, 32; 32, 36 thereby to extract the electronic parts. At this time, the cases 31, 36 having the through holes 40, 50 can be reused. If the deformed portions 55 are cut off at the destination of shipping, the trace of disassembly is left at a cut face 56, as shown in FIG. 4, so that the opening can be easily found out. As a result, the reconstruction of the electronic parts can be easily discovered. If the frame case 32 having the projecting pieces 42, 45 is made unavailable, on the other hand, the electronic part protecting structure cannot be reconstructed. The loosely fitted state can be achieved by adjusting the conditions including the diameter of the through holes 40 and 50, the diameter of the projecting pieces 42, 45, the heating temperature and the pressure.

By providing a plurality of the through holes 40, 50 and the projecting pieces 42, 45 (two through holes in this embodiment, respectively), the cases 31, 32; 32, 36 can be prevented from being opened by turning them laterally in the opposite directions.

Since the through holes 40, 50 are formed in the recesses 54, on the other hand, the deformed portions 55 can be made hard to cut off to prevent the cases 31, 32; 32, 36 from being opened. After the protection, moreover, a simple shape can be made to leave the projecting pieces 42, 45 submerged below the surfaces 31a and 36a.

Here, this embodiment has been described on the liquid crystal display device 38 which has the light source 34 assembled therein. Considering the lifetime, the light source 34 may be made removable. Moreover, the liquid crystal display device may be of the reflection type requiring no light source. In the liquid crystal display device 38 of this embodiment, the frame case 32 is shared so that the surface protecting case 31 and the frame case 32, and the back protecting case 36 and the frame case 32 are individually protected. Despite of this description, however, the target of protection may have any construction if the electronic parts are arranged to be protected between the pair of cases.

Figure 5:
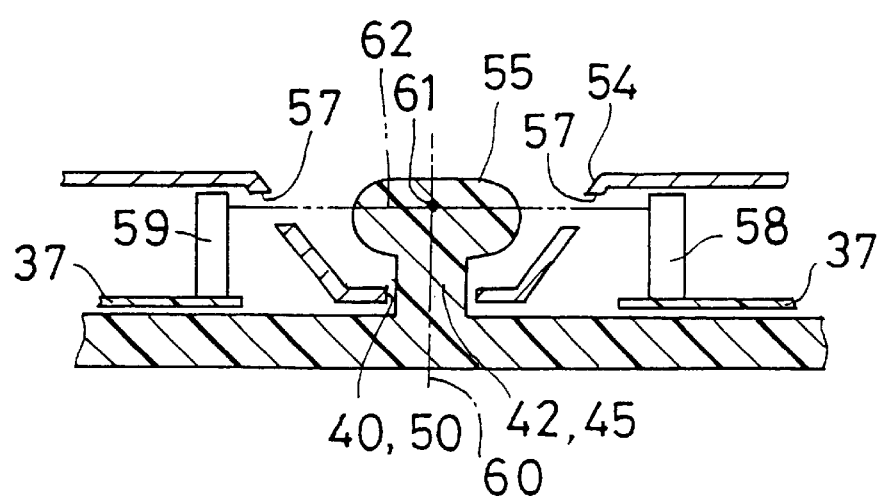
FIG. 5 is a section showing a protecting structure according to a second embodiment of the invention.

FIG. 5 is a sectional view showing a protecting structure according to a second embodiment of the invention. In this embodiment, it is possible to detect that the deformed portion 55 has been cut off. In the recess 54, there are formed openings 57 which are located in opposite positions across the deformed portion 55. Specifically, the openings 57 are formed in the opposite positions through a center point 61 at which the centers of the deformed portion 55 in a vertical direction 60 and in a horizontal direction 62 intersect. A light emitting element 58 and a light receiving element 59 are arranged to face the individual openings 57. The light emitting element 58 and the light receiving element 59 are packaged on the drive circuit substrate 37.

The light from the light emitting element 58 is shielded by the deformed portion 55 to fail to reach the light receiving element 59, while the deformed portion 55 is present, but reaches the light receiving element 59 when the deformed portion 55 is cut off. At this time, the light receiving element 59 outputs a light detection signal. A display control circuit, as packaged on the drive circuit substrate 37, recognizes the cut-off of the deformed portion 55 in response to the light detection signal to control the display state of the liquid crystal display element 33 with a liquid crystal drive signal based on the light detection signal. For example, the liquid crystal drive signal is blocked to make a no-display state or a predetermined warning display state.

Since the opening of the cases 31, 32; 32, 36 is thus reported by using the electronic parts to be protected, the warning construction can be realized at a low cost without any requirement for providing a light emitting diode additionally for the warning purpose. This embodiment has been described on the example of optical detection, but the detection may be electrically made.

Here, when the liquid crystal display device 38 is publicly used as a play device, the electronic parts can be prevented by preventing easy opening of the case with the protecting structure from being reconstructed to prevent the unauthorized use. In the first and second embodiments, the liquid crystal display element 33, the light source 34 and the drive circuit substrate 37 are protected, but the electronic parts to be protected should not be limited thereto.

Figure 6:
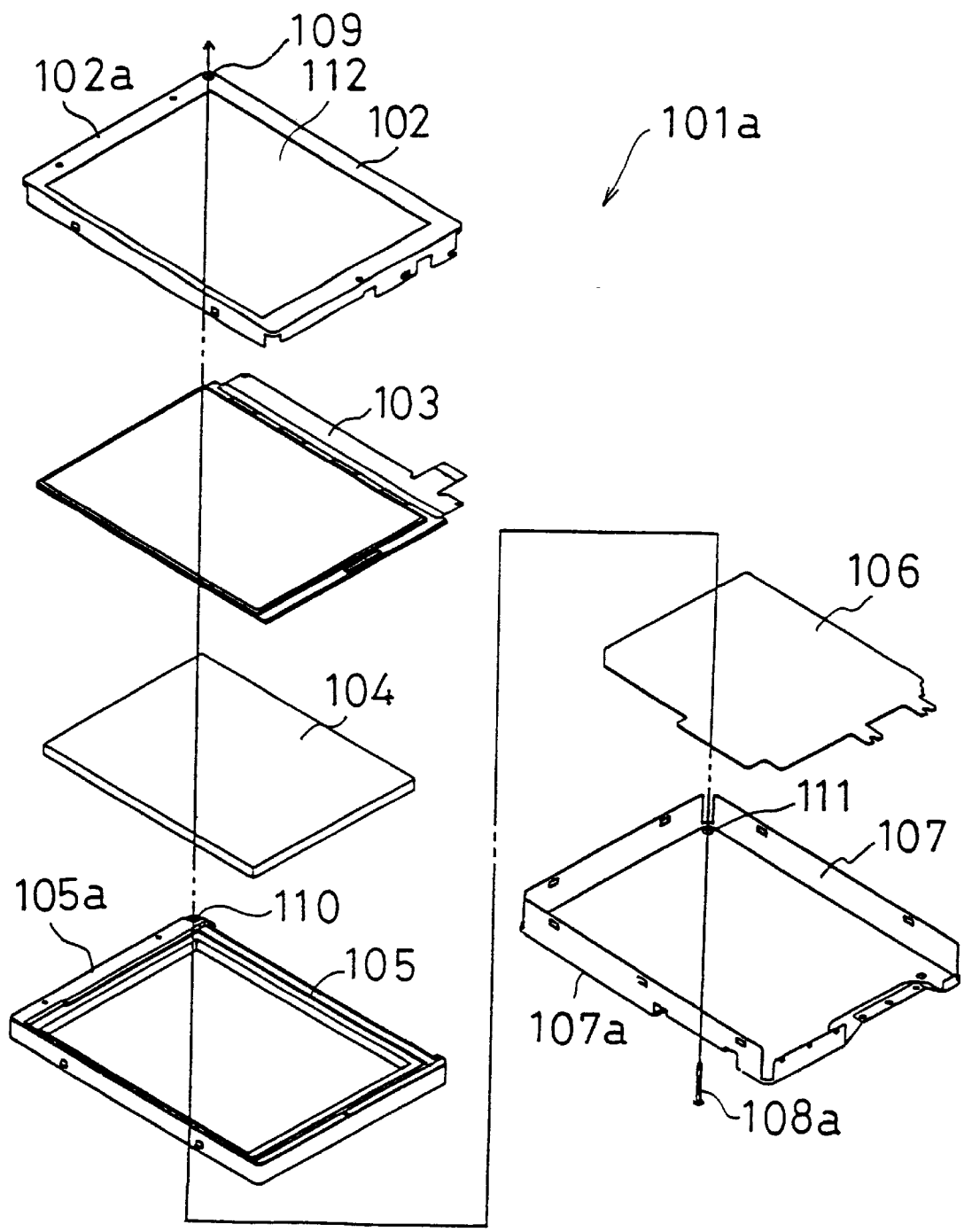
FIG. 6 is an exploded perspective view showing a liquid crystal display device 101a which is protected by an electronic part protecting structure according to a third embodiment of the invention.
Figure 7:
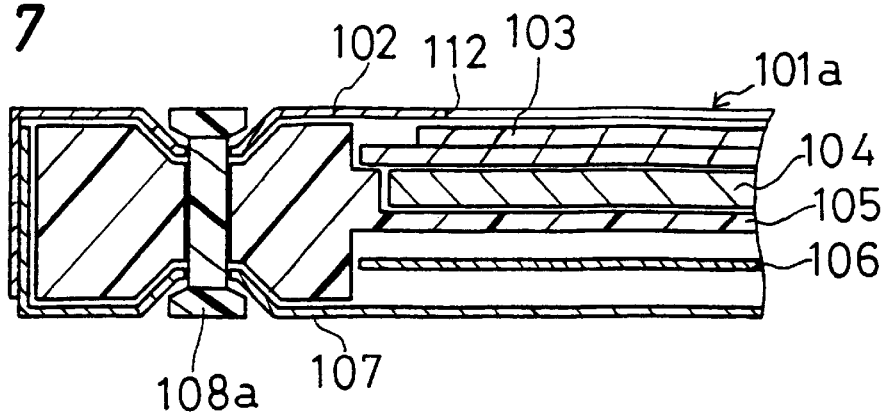

FIG. 6 is an exploded perspective view showing a liquid crystal display device 101a which is protected by an electronic part protecting structure according to a third embodiment of the invention. FIG. 7 is a section of the liquid crystal display device 101a. This liquid crystal display device 101a is constructed to include a surface protecting case 102, a liquid crystal display element 103, a light source 104, a frame case 105, a drive circuit substrate 106 and a back protecting case 107. The liquid crystal display element 103 and the light source 104 are arranged between the surface protecting case 102 and the frame case 105, and the drive circuit substrate 106 is arranged between the frame case 105 and the back protecting case 107.

The surface protecting case 102 has a transparent portion 112 which is confronted by the display face of the liquid crystal display element 103 and the light irradiating face of the light source 104. In a surface 102a of the surface protecting case 102, there is formed a through hole 109. This through hole 109 may be singular or plural, but this embodiment will be described on the single through hole 109. On the other hand, the surface protecting case 102 may be made of a metal or resin but is made of a sheet metal in this embodiment.

The liquid crystal display element 103 is arranged at the side of the surface protecting case 102 between the surface protecting case 102 and the frame case 105, and the light source 104 is arranged at the side of the frame case 105. A through hole 110 is formed in a surface 105a of the frame case 105. This frame case 105 may be made of a metal or resin but is made of a plastic resin in this embodiment.

The liquid crystal display element 103 is made by regularly arraying the minimum display units called pixels, and is provided with such a liquid crystal between two transparent substrates which are wired for applying independent drive voltages to the pixels, as acting as an optically modulating element having optical characteristics varied with the drive voltages. The light source 104 is provided for improving the visibility by optically irradiating the liquid crystal display element 103 and may be an under-type fluorescent lamp or a planar light source, but is exemplified in this embodiment by including a fluorescent lamp arranged at the inner face ends and an optical conductor for conducting the light from the lamp to the front face. Between the surface protecting case 102 and the frame case 105, there are arranged the liquid crystal display element 103 and the light source 104 which have been confirmed to act normally. Specifically, the liquid crystal display element 103 and the light source 104 are fixed on the frame case 105 by means of an adhesive double coated tape and are covered with the surface protecting case 102.

In a surface 107a of the back protecting case 107, there is formed a through hole 111. On the other hand, the back protecting case 107 may be made of a metal or resin but is made of a sheet metal in this embodiment as in the surface protecting case 102. The drive circuit substrate 106 applies the independent drive voltages to the individual pixels of the liquid crystal display element 103 and is arranged between the frame case 105 and the back protecting case 107.

Into the through holes 109 to 111, there is inserted a single protecting pin member 108a. This protecting pin member 108a is deformed at its leading end more largely than the through holes 109 to 111. Thus, the liquid crystal display element 103, the light source 104 and the drive circuit substrate 106 are protected through the frame case 105 by the surface protecting case 102 and the back protecting case 107 to construct the liquid crystal display device 101a.

Figure 8A:
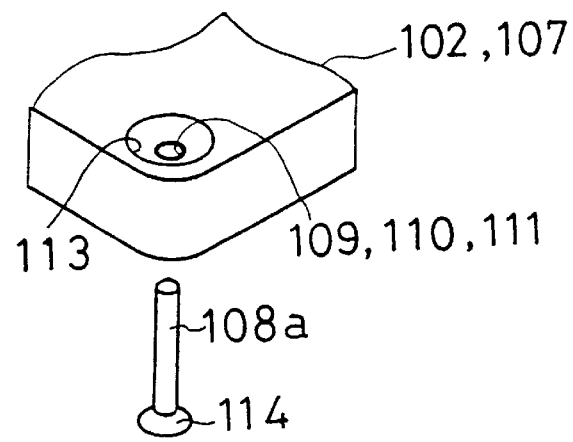
Figure 8B:
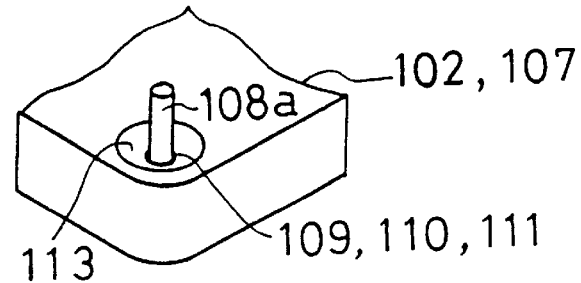
Figure 8C:
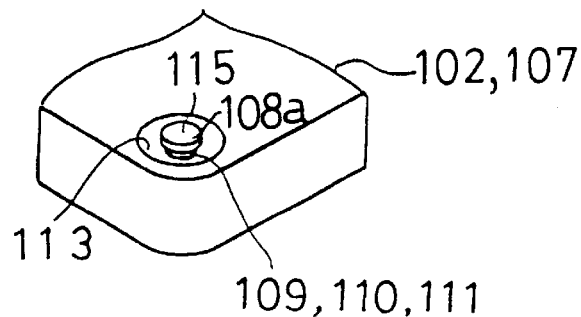

FIGS. 8A to 8C are diagrams stepwise illustrating a protecting process applied to the liquid crystal display device 101a. Here, the protecting process deforms the leading end of the protecting pin member 108a which has been inserted into the through holes 109 to 111 such that it is made so larger than the through holes 109 to 111 as to have no restoration. Here, before the protecting process, the tests are executed on the operations of the liquid crystal display device. The liquid crystal display device is disassembled and corrected, if found defective, so that only the non-defective device is protected.

The protecting pin member 108a to be prepared is made slender and is preferred to have such a flat portion 114 formed at its other end opposed to its one end to be inserted into the through holes 109 to 111 as is made larger than the through holes, as shown in FIG. 8A, and to have a larger length than the entire length of the through holes 109 to 111.

As shown in FIG. 8B, the protecting pin member 108a is inserted from its one end into the through holes 109 to 111. The length of insertion of the protecting pin member 108a is regulated by the flat portion 114. The one end portion of the protecting pin member 108a, as protruded from the through holes 109 to 111 is deformed to provide a deformed portion 115, as shown in FIG. 8C. This deformed portion 115 can be formed by applying heat and load to the one end portion of the protecting pin member 108a. This deformation need not require the application of both the heat and the load but may be effected by either of them.

The deformed portion 115 is given such a size larger than that of the through holes 109 to 111 that it can not be restored. These deformed portion 115 and flat portion 114 make it impossible to open the cases 102, 107 but possible to prevent the reconstruction of the liquid crystal display element 103, the light source 104 and the drive circuit substrate 106. This protecting structure can be realized merely by the mechanical working and with a relatively small number of components so that it is simple, small and inexpensive.

When the frame case 105 is made of a resin having a relatively low heat conductivity, on the other hand, those electronic parts can be protected from the heat by shielding the heat which might otherwise be transferred to the liquid crystal display element 103, the light source 104 and the drive circuit substrate 106.

The cases 102, 107 are not adhered by fitting the protecting pin member 108a loosely in the through holes 109 to 111. If the protected electronic parts are defective, therefore, the flat portion 114 or the deformed portion 115 can be cut off to open the cases 102, 107 thereby to extract the electronic parts. At this time, all the components other than the protecting pin member 108a can be reused.

If the flat portion 114 or the deformed portion 115 are cutoff at the destination of shipping, the protecting pin member 108a is lost so that the opening can be easily found out. As a result, the reconstruction of the electronic parts can be easily discovered. The loosely fitted state can be achieved by adjusting the conditions including the diameter of the through holes 109 to 111, the diameter of the protecting pin member 108a, the heating temperature and the pressure.

The through hole 109 is preferably formed in the recess 113 of the surface 102a of the surface protecting case 102. Likewise, the through hole 111 is preferably formed in the recess (not shown) of the surface 107a of the back protecting case 107. As a result, the flat portion 114 and the deformed portion 115 can be made hard to cut off to prevent the cases 102 and 107 further from being opened. After the protections, moreover, a simple shape can be made to leave the protecting pin member 108a submerged below the surface 102a of the surface protecting case 102 and the surface 107a of the back protecting case 107.

Here, this embodiment has been described on the liquid crystal display device 101a which has the light source 104 assembled therein. Considering the lifetime, the light source 104 may be made removable. Moreover, the liquid crystal display device may be of the reflection type requiring no light source.

On the other hand, the liquid crystal display device 101a of this embodiment has been described on the example in which the electronic parts are protected through the frame case 105 by the surface protecting case 102 and the back protecting case 107. Despite of this description, however, the target of protection may have any construction if the electronic parts are arranged to be protected between the pair of cases. For example, the through hole 110 may not be formed in the frame case 105. Moreover, a through hole may be formed in the electronic parts such as the liquid crystal display element 103, the light source 104 and the drive circuit substrate 106.

FIGS. 9A and 9B are sections showing other liquid crystal display devices 101b, 101c which are protected by an electronic part protecting structure according to the third embodiment. Each of the liquid crystal display devices 101b, 101c is constructed to include the surface protecting case 102, the liquid crystal display element 103, the light source 104 and the back protecting case 107 of the liquid crystal display device 101a. In other words, the liquid crystal display devices 101b, 101c are constructed like the liquid crystal display device 101a excepting that they do not use the frame case 105 and the drive circuit substrate 106. The surface and back protecting cases 102, 107 are exclusively clamped by the protecting pin member 108a. Even when the size, thickness and cost are thus further reduced by employing neither the frame case 105 nor the drive circuit substrate 106, the liquid crystal display device 103 and the light source 104 can be protected by the protecting structure of the invention.

Here in the liquid crystal display device 101b shown in FIG. 9A, the surface protecting case 102 and the back protecting case 107 are equipped with a fitting portion 116. After this fitting portion 116 was formed by clamping the liquid crystal display element 103 and the light source 104 by the surface and back protecting cases 102, 107, these surface and back protecting cases 102, 107 can be reliably fixed by the protecting pin member 108a. In short, after the completion of the module, the protecting pin member 108a can be easily deformed to improve the production yield merely by deforming the protecting pin member 108a.

On the other hand, the fitting portion 116 is omitted from the liquid crystal display device 101c shown in FIG. 9B. Specifically, the liquid crystal display element 103 and the light source 104 are clamped by the surface and back protecting cases 102, 107, and these surface and back protecting cases 102, 107 are then reliably fixed by the protecting pin member 108a. As a result, it is possible to reduce the size and cost more.

Figure 10:
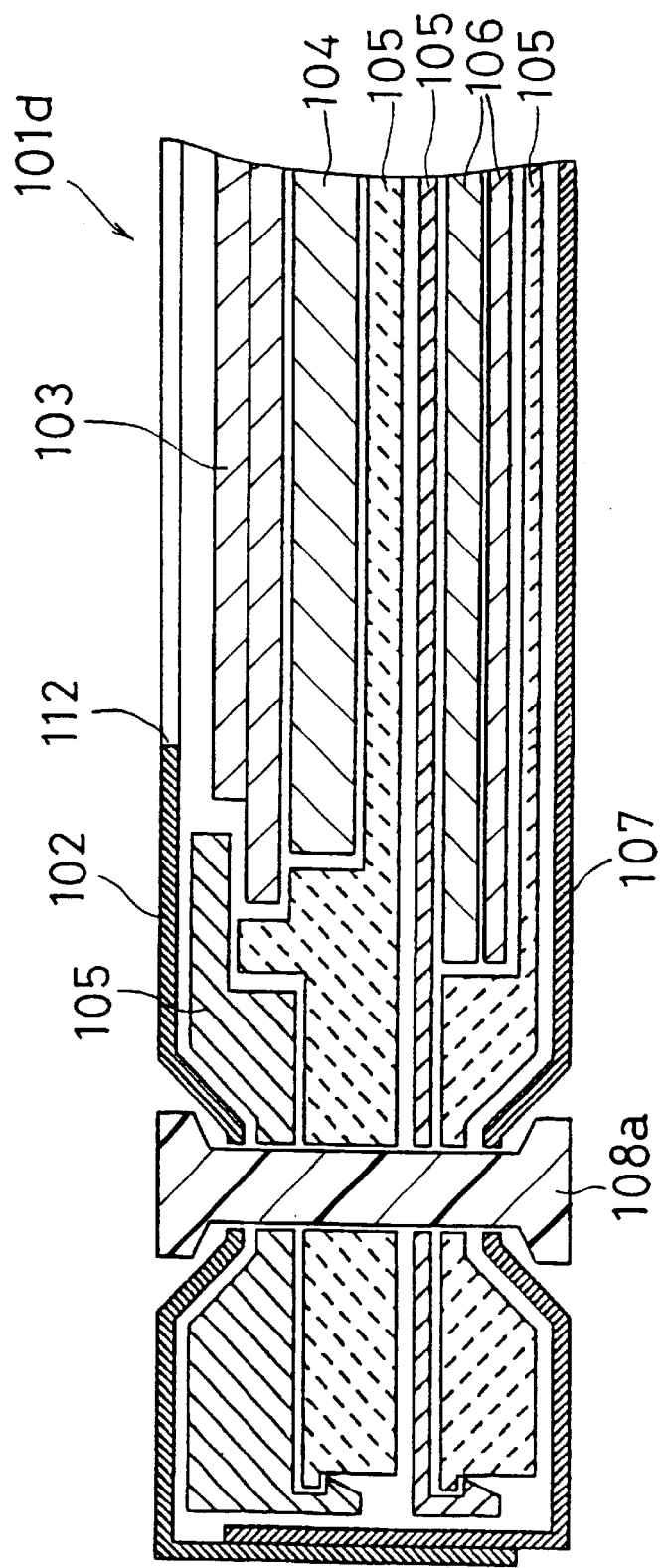
FIG. 10 is a sectional view showing still another liquid crystal display device 101d which is protected by the electronic part protecting structure according to the third embodiment.

FIG. 10 is a sectional view showing still another liquid crystal display device 101d which is protected by the electronic part protecting structure according to the third embodiment. This liquid crystal display device 101d is constructed to include the surface protecting case 102, the liquid crystal display element 103, the light source 104, the frame case 105, the drive circuit substrate 106 and the back protecting case 107 of the liquid crystal display device 101a, but the frame case 105 and the drive circuit substrate 106 are included in plurality. The surface and back protecting cases 102 and 107 are clamped by the protecting pin member 108a through the plural frame cases 105. Even when the plural frame cases 105 and the plural drive circuit substrates 106 are used, the liquid crystal display element 103, the light source 104 and the drive circuit substrate 106 can be protected by forming the through hole in all or some of the plural frame cases 105 and by inserting the protecting pin member 108a to form the deformed portion in accordance with the invention. It is further possible to improve the integrity and arrangement accuracy of each component thereby to prevent the arrangement error.

Figure 11:
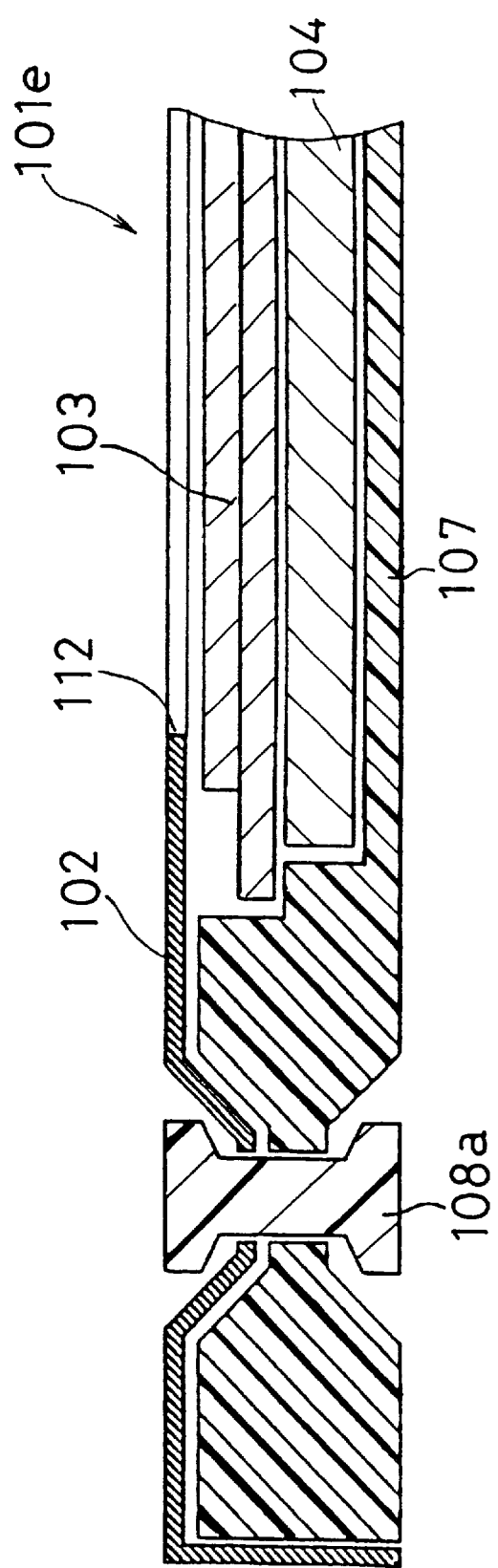
FIG. 11 is a sectional view showing still another liquid crystal display device 101e which is protected by the electronic part protecting structure according to the third embodiment.

FIG. 11 is a section showing still another liquid crystal display device 101e which is protected by the electronic part protecting structure according to the third embodiment. This liquid crystal display device 101e is constructed to include the surface protecting case 102, the liquid crystal display element 103, the light source 104 and the back protecting case 107 of the liquid crystal display device 101a. In other words, the liquid crystal display device 101e is constructed like the liquid crystal display device 101a excepting that the frame case 105 and the drive circuit substrate 106 are not used and that the back protecting case 107 is made of a resin. The surface and back protecting cases 102, 107 are exclusively clamped by the protecting pin member 108a. Even when the size, thickness and cost are to be further reduced by using neither the frame case 105 nor the drive circuit substrate 106 and by making the back protecting case 107 of a resin, it is possible according to the protecting structure of the invention to protect the liquid crystal display element 103 and the light source 104 and to reduce the components.

Figure 12A:
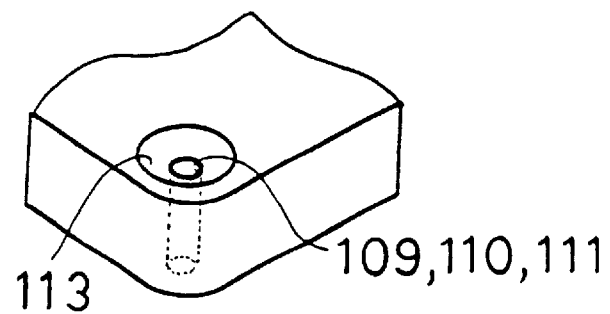
Figure 12B:
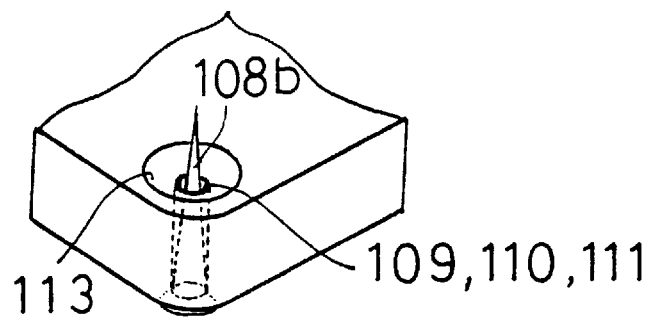
Figure 12C:
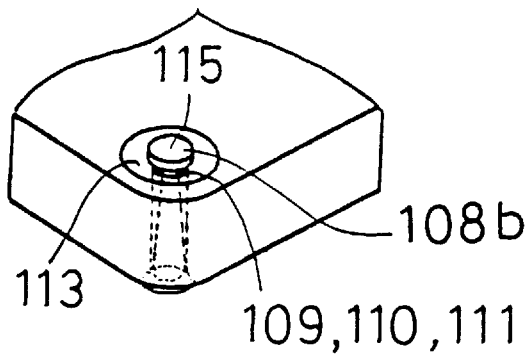
Figure 13A:
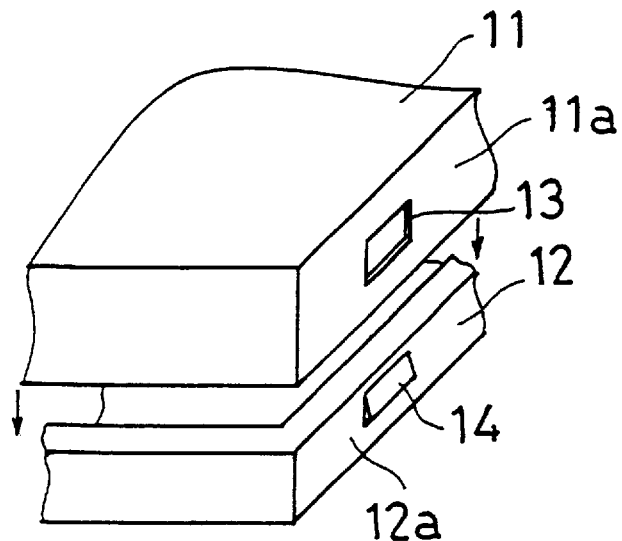
FIG. 13A is an exploded perspective view showing a structure of the liquid crystal display device of the first prior art.
Figure 13B:
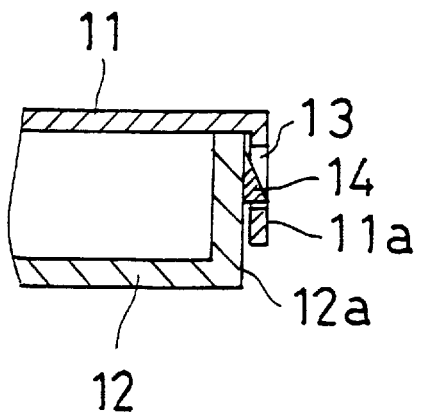
FIG. 13B is a sectional view of the same.
Figure 14:
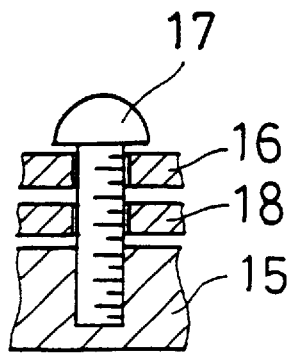
FIG. 14 is a sectional view showing a structure of the liquid crystal display device of the second prior art.
Figure 15:
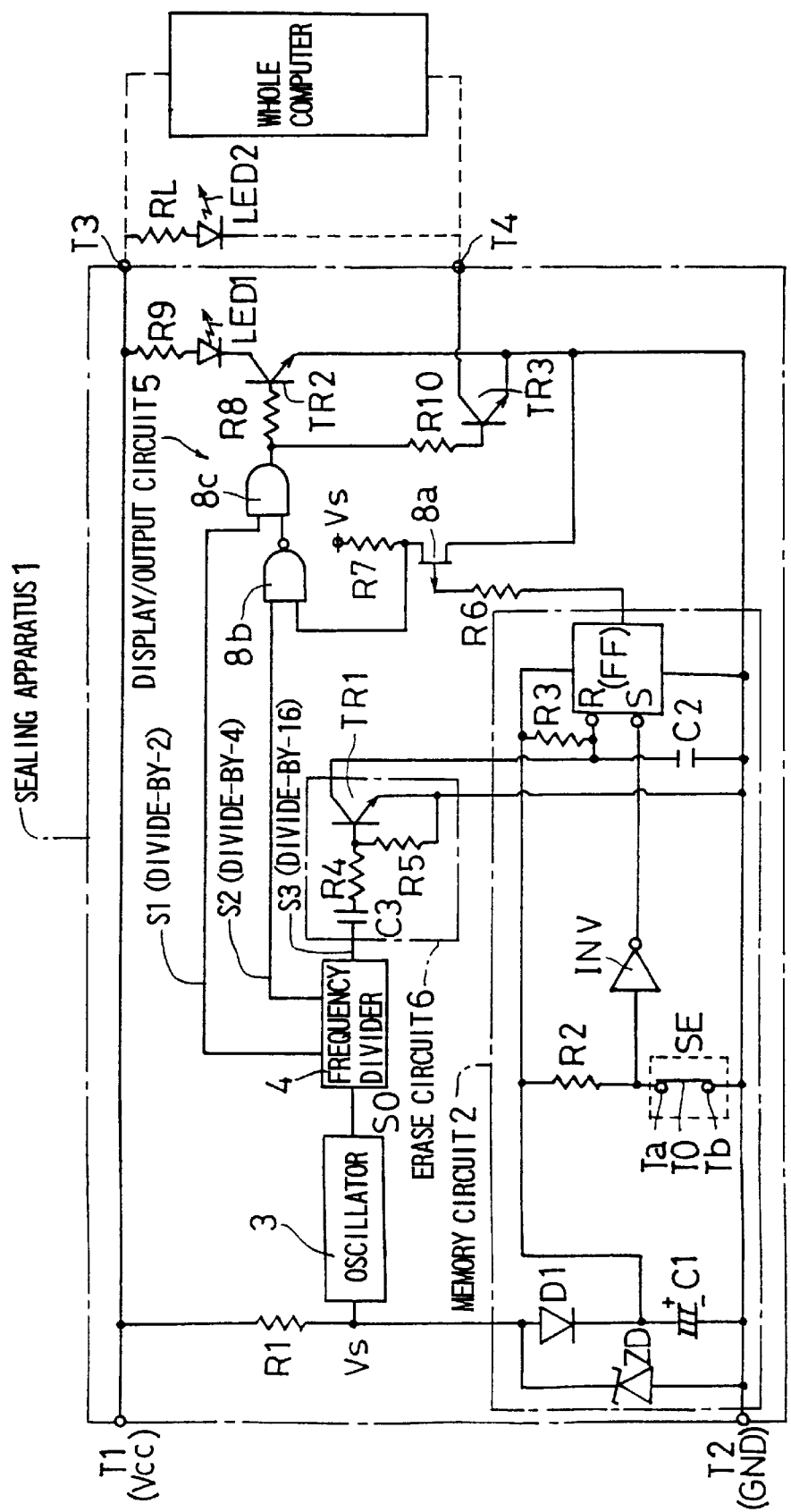
FIG. 15 is a circuit diagram showing a sealing apparatus 1 for detecting the opening of a case electrically.
Figure 16A:
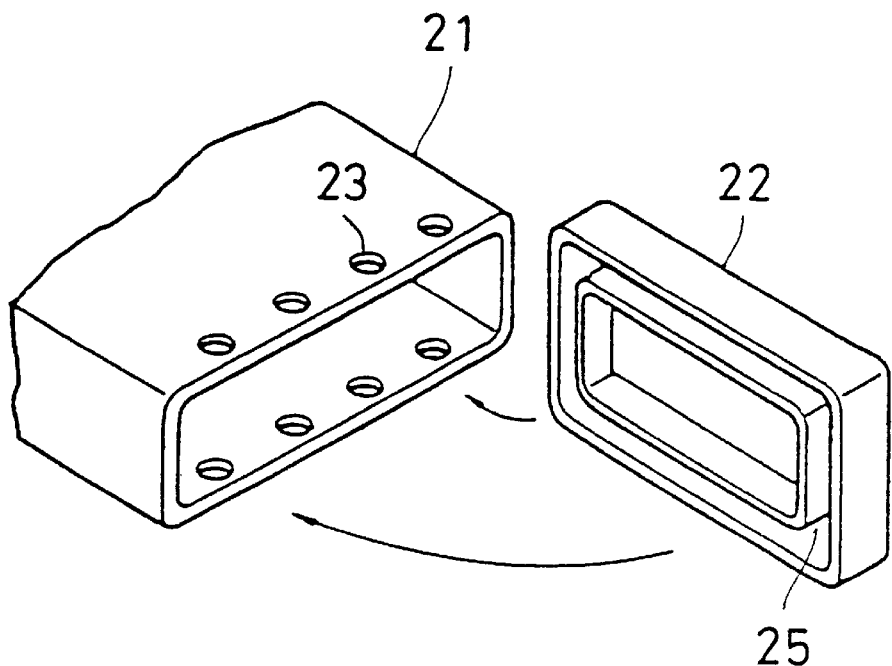
FIGS. 16A and 16B are diagrams showing a slider 21 and a protective cover 22.
Figure 16B:
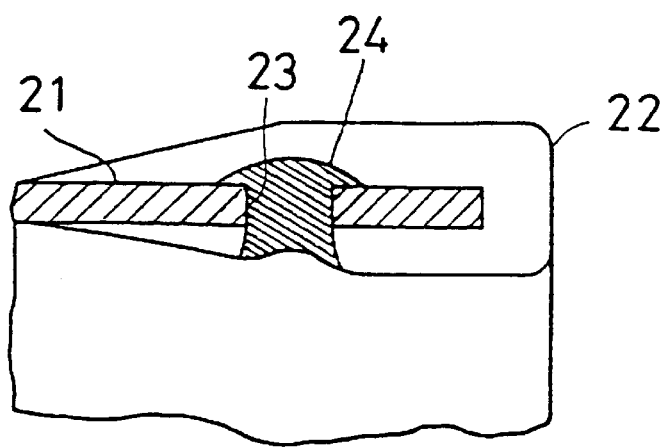

FIGS. 12A to 12C are diagrams stepwise illustrating a protecting process using another protective pin member 108b in place of the protective pin member 108a. The protecting pin member 108b to be prepared is made slender like the foregoing protecting pin member 108a. As shown in FIG. 12A, however, the protecting pin member 108b is characterized in that its one end to be inserted into the through holes is tapered, in that its maximum diameter is made larger than the internal diameter of the through holes 109 to 111, and in that its length is made larger than the total one of the through holes 109 to 111. The protecting pin member 108b, as exemplified in this embodiment, is a given a circular cone shape, but any shape such as a pyramid cone may be satisfactorily employed if the protecting pin member 108b has a tapered shape.

As shown in FIG. 12B, the protecting pin member 108b is inserted from its one end into the through holes 109 to 111. The length of insertion of the protecting pin member 108b is regulated by the diameter of the protecting pin member 108b and the internal diameter of the through holes 109 to 111. The one end portion of the protecting pin member 108b, as protruded from the through holes 109 to 111 is deformed like before to provide the deformed portion 115, as shown in FIG. 12C. As a result, it is possible to prevent the cases 102, 107 from being easily opened and to prevent the reconstruction of the electronic parts such as the liquid crystal display element 103, the light source 104 and the drive circuit substrate 106.

By using this protecting pin member 108b having the maximum diameter larger than the internal diameter of the through holes 109 to 111, the protecting pin member 108b cannot be inserted any more at the position in which the diameter of the protecting pin member 108b becomes equal to the internal diameter of the through holes 109 to 111, so that the protecting pin member 108b can be temporarily fixed in that equal state. Since the protecting pin member 108b has a larger length than the total length of the through holes 109 to 111, the protecting pin member 108b is protruded, in the temporary fixed state, at its one end from the through holes 109 to 111 so that the deformed portion 115 is made at the protruded portion. This deformed portion 115 can be made in the temporary fixed state to facilitate the deformation.

Here, when the liquid crystal display devices 101a to 101e are publicly used as a play device, the electronic parts can be prevented by preventing easy opening of the case with the protecting structure from being reconstructed to prevent the unauthorized use. In this embodiment, the liquid crystal display element 103, the light source 104 and the drive circuit substrate 106 are protected, but the electronic parts to be protected should not be limited thereto.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic part protecting structure for protecting a plurality of electronic parts, comprising a pair of cases between which the electronic parts are arranged, the plurality of electronic parts being protected between the pair of cases and wherein the plurality of electronic parts are detachable from the cases, both the pair of cases being provided with a through hole formed in a recess of a case surface, wherein pin members are inserted into the through holes, which pin members have such deformed portions at their both ends that are made larger than the through holes and deformed to be unrestorable, so that both deformed ends of at least one pin member are located in respective recesses so that a portion of each deformed end of the one pin member is submersed below a respective case surface.

2. The electronic part protecting structure of claim 1, wherein the through hole is formed in a recess which is formed in a case surface, wherein the deformed portion of one of the pin members is fitted into the recess formed in the case surface in a manner so that a portion of the pin member is submerged below the case surface, and wherein the one pin member is loosely fitted into corresponding through holes, and the deformed portion of the pin member can be cut off.

3. The structure of claim 2, wherein said deformed portions of said pin members are located with respective recesses in said cases, and wherein said deformed portions arc located within said respective recesses and are each located entirely submerged below a corresponding major case surface defining a top of a corresponding recess.

4. The electronic part protecting structure of claim 1, wherein the electronic parts include a liquid crystal display element and a substrate of a drive circuit for driving the liquid crystal display element, or at least one of a liquid crystal display element, a substrate of a drive circuit for driving a liquid crystal display element, and a light source of a liquid crystal display element.

5. The electronic part protecting structure of claim 1, wherein the deformed portions are created upon application of heat to the pin members.

* * * * *